United States Patent Office 3,268,580
Patented August 23, 1966

3,268,580
DIFLUORO DIALKYL PHOSPHORANES AND METHOD OF PREPARATION OF DIFLUORO HYDROCARBON PHOSPHORANES WITH TETRAFLUOROHYDRAZINE
Murray Garber, Trenton, N.J., and William Charles Firth, Jr., Stamford, Conn., assignors to American Cyanamid Company, Stamford, Conn., a corporation of Maine
No Drawing. Filed Sept. 3, 1963, Ser. No. 306,657
10 Claims. (Cl. 260—543)

This application is a continuation-in-part of our copending application, Serial No. 207,156, filed June 28, 1962, now abandoned.

This invention relates broadly to the preparation of fluorinated phosphorus compounds and, more particularly, to the production of such compounds which contain fluorine bonded directly to phosphorus. Still more particularly the invention is concerned with a new and unobvious method of producing compounds containing fluorine bonded directly to phosphorus which comprises treating a P-fluorinatable trivalent phosphorus-containing compound with an oxidative fluorinating agent comprising tetrafluorohydrazine ($N_2F_4$). The reaction proceeds smoothly, usually at ambient temperature. Yields of the P-fluorinated compound above 90% based on the starting phosphorus compound have been obtained by the method of this invention. This invention also relates to novel compounds resulting from such method.

It was known prior to the present invention that fluorinated compounds containing fluorine bonded directly to phosphorus could be prepared. For example, British Patent No. 734,187 discloses a method for the preparation of alkyltetrafluorophosphoranes using alkylphosphonous dichloride, aluminum chloride and hydrogen fluoride as reagents. Also, U.S. Patent No. 2,904,588 describes the synthesis of phenyltetrafluorophosphorane by the oxidative fluorination of phenylphosphonous dichloride with antimony trifluoride-antimony pentafluoride mixtures. The use of sulfur tetrafluoride ($SF_4$) as an oxidative fluorinating agent in fluorinating phosphorus-containing compounds is described by Smith [J.A.C.S., 82, 6176–77 (1960)]. Specifically, Smith describes the oxidative fluorination with sulfur tetrafluoride of such phosphorus-containing compounds as phenylphosphonic acid, phenylphosphonic difluoride, diphenylphosphinic acid, triphenylphosphine and triphenylphosphine oxide.

The present invention is based on our discovery that tetrafluorohydrazine constitutes a very effective and satisfactory oxidative fluorinating agent in fluorinating trivalent phosphorus-containing compounds which are P-fluorinatable. The present invention is especially applicable to the P-fluorinatable trivalent phosphorus-containing compounds represented by the general formulae:

(I), (II), (III), (IV)

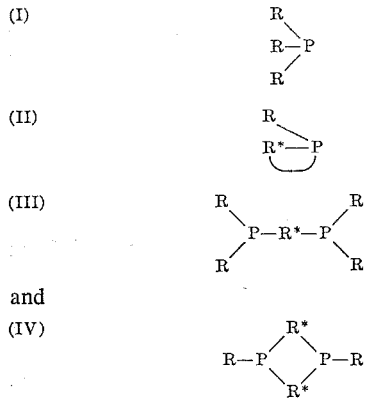

wherein each R represents a member of the group consisting of hydrogen, hydrocarbon radicals, and substituted hydrocarbon radicals and wherein each R* represents a member of the group consisting of hydrocarbon radicals and substituted hydrocarbon radicals. The hydrocarbon radicals represented by each R and by each R* may be the same or different.

Illustrative examples of hydrocarbon radicals (i.e., monovalent hydrocarbon radicals) represented by R in the above formulae are alkyl (including cycloalkyl), alkenyl (including cycloalkenyl), aralkyl, aralkenyl, aryl, alkaryl and alkenylaryl. More specific examples of such radicals are methyl, ethyl, propyl, isopropyl, butyl, isobutyl, sec.-butyl, tert.-butyl, amyl to tetracontyl, inclusive (both normal and isomeric forms), cyclopentyl, cyclohexyl, cyclohexenyl, cycloheptyl, etc.; cyclopentadienyl, the monomethyl-, dimethyl-, trimethyl- and tetramethylcyclopentadienyl radicals, and the mono- and poly- (i.e., di-, tri- and tetra-) ethyl-, propyl-, isopropyl-, n-butyl-, isobutyl-, sec.-butyl-, n-amyl-, isoamyl-, etc., cyclopentadienyl radicals; benzyl, phenylethyl, phenylpropyl, phenylisopropyl, phenylallyl, fluorenyl, dinaphthylenemethyl, etc.; phenyl, biphenylyl or xenyl, naphthyl, fenchyl, phenanthryl, benzonaphthyl, anthryl, naphthyl-substituted anthryl, dianthryl, fluorenyl, etc.; tolyl, xylyl, ethylphenyl, propylphenyl, isopropylphenyl, butylphenyl, allylphenyl, etc.; vinyl, allyl, methallyl, propenyl, isopropenyl (betaallyl), 1-butenyl, 2-butenyl (crotyl), 3-butenyl, pentenyl, hexenyl, butadienyl, pentadienyl, etc.

Illustrative examples of hydrocarbon radicals (i.e., bivalent hydrocarbon radicals) represented by R* in the above formulae are the bivalent radicals corresponding to the above listed monovalent radicals illustrative of those represented by R.

Illustrative of the substituted hydrocarbon radicals represented by R and R* in the above formulae are the fluoro-, chloro-, bromo-, iodo-, cyano-, alkoxy- (e.g., methoxy-, ethoxy-, propoxy-), aroxy- (e.g. phenoxy-), and ester i.e., R'C(O)O-substituted (e.g., formate, acetate, propionate, butyrate) forms of the above listed hydrocarbon radicals. Also, R and R* may be monosubstituted or polysubstituted radicals. Thus, these hydrocarbon radicals may have any neutral substituents thereon, whether reactive with tetrafluorohydrazine or not, so long as they do not interfere with the oxidative fluorination of the P-fluorinatable trivalent phosphorus compound by the tetrafluorohydrazine.

Among the products produced by the reaction of compounds of Formulae I, II, III, and IV with tetrafluorohydrazine are those novel compounds represented by the general formulae:

(V), (VI), (VII), (VIII)

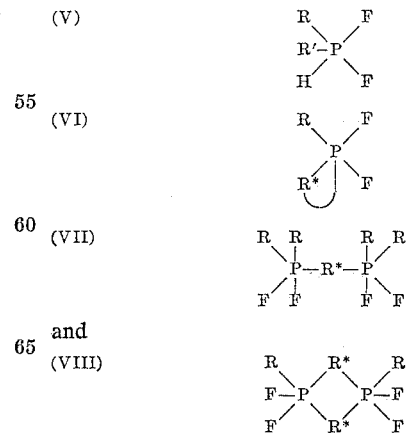

wherein each R represents a member of the group consisting of hydrogen, hydrocarbon radicals, and substituted hydrocarbon radicals and wherein R' and each R* represents a member of the group consisting of hydrocarbon radicals and substituted hydrocarbon radicals.

Illustrative examples of the radicals represented by R, R', and R* are to be found in the above listings in reference to Formulae I, II, III, and IV.

It was quite surprising and wholly unobvious that P-fluorinated compounds could be prepared as briefly described in the first paragraph of this specification and more fully hereafter using tetrafluorohydrazine as a reactant. Taking di-n-butylphosphine as illustrative of the trivalent phosphorus reactant with tetrafluorohydrazine, it normally would be expected that the reaction would proceed to yield di-n-butyl difluoroaminophosphine and difluoroamine, thus:

(IX) $(n-C_4H_9)_2PH + N_2F_4 \rightarrow (n-C_4H_9)_2PNF_2 + HNF_2$

Unexpectedly, however, the reaction proceeds at room temperature (20°–30° C.) to yield di-n-butyldifluorophosphorane and nitrogen, thus:

(X) 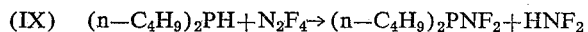
$$2(n-C_4H_9)_2PH + N_2F_4 \xrightarrow{25° C.} 2(n-C_4H_9)_2PHF_2 + N_2$$

The reaction is unexpected because cleavage of the N-F bond in $N_2F_4$ has occurred preferentially to cleavage of the N-N bond. It is instructive because it indicates that trivalent phosphorus compounds can react with $N_2F_4$ by an unknown mechanism which probably involves the unshared electron pair on the phosphorus atom. This is also substantiated by the fact that tri-n-butylphosphine decomposes $N_2F_4$ to nitrogen while it is oxidized to tri-n-butyldifluorophosphorane, thus:

(XI) 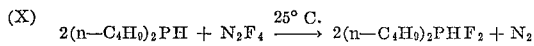
$$2(n-C_4H_9)_3P + N_2F_4 \xrightarrow{25° C.} 2(n-C_4H_9)_3PF_2 + N_2$$

The reaction between the P-fluorinatable phosphorus-containing compound and the oxidative fluorinating agent comprising tetrafluorohydrazine is carried out under anhydrous conditions. Although not limited thereto, the reaction is often advantageously effected while the phosphorus-containing compound and the tetrafluorohydrazine are in an inert (substantially completely inert), anhydrous (substantially completely anhydrous), liquid, reaction medium. By "inert" or "substantially completely inert," anhydrous, liquid reaction medium is meant such a reaction medium which is so inert or non-reactive toward the reactants and the reaction product or products (i.e., a P-fluorinated trivalent phosphorus-containing compound) that it will not affect the course of the reaction or the constitution of the desired P-fluorinated reaction product. By "anhydrous" or "substantially completely anhydrous" in the foregoing sentences is meant one which contains no more than a trace of water, and by "liquid reaction medium" is meant one which is liquid at the temperature and pressure employed in effecting the reaction. In other words, the inert, anhydrous, liquid, reaction medium in which the reaction is effected may or may not be a liquid at room temperature or at any other temperature below the reaction temperature. Preferably the liquid reaction medium employed is one which is volatile (volatilizable) without decomposition.

Illustrative examples of inert, anhydrous, liquid, reaction media that can be employed are liquid aromatic hydrocarbons such, for example, as benzene, toluene, xylene, etc.; the various liquid (or liquifiable) chlorinated benzenes, toluenes and xylenes; liquid saturated aliphatic hydrocarbons, e.g., pentane, hexane, heptane, octane, nonane, decane, dodecane, commercially available petroleum ethers, etc., and the corresponding halogenated (chlorinated, brominated, fluorinated, etc.) saturated aliphatic hydrocarbons, including the simple and "mixed" (containing different halogen atoms) perhalogenated saturated aliphatic hydrocarbons, e.g., 1,2,3-trichloropentafluoropropane, octachloropropane, octafluoropropane, etc.; ethers, e.g., diethyl ether, di-n-propyl ether, diisopropyl ether, di-n-butyl ether, di-n-amyl ether, the mixed normal and isomeric diamyl ethers, methyl butyl ether, diglycoldimethyl ether, tetrahydrofuran, tetrahydro-2-methylfuran, m-dioxane, pentamethylene oxide, 2-methyl-1,3-dioxolane, etc.; ketones, including both the normal and various isomeric forms, e.g., the normal and various isomeric dibutyl and diamyl ketones, methyl ethyl ketone, methyl propyl ketone, methyl butyl ketone, methyl amyl ketone, ethyl amyl ketone, methyl benzyl ketone, ethyl benzyl ketone, methyl phenyl ketone (acetophenone), etc.

Other examples of liquid reaction media will be apparent to those skilled in the art from the foregoing illustrative examples. Preferably the liquid reaction medium is one that boils below 200° C., and usually is one which boils below about 150° C.

The reaction with which the present invention is concerned can be carried out in the absence of a solvent as is shown in some of the examples which follow.

The P-fluorinatable phosphorus-containing compound and the tetrafluorohydrazine are usually employed in approximately stoichiometrical proportions or with the latter in molar excess, e.g., from 0.1 mole percent to 300 mole percent in excess of the P-fluorinatable compound.

The temperature at which the reaction is effected advantageously is ambient temperature, e.g., from about 15° C. to 35° C., and, more particularly, from about 20° C. to about 30° C., which latter range of temperatures is the usual room temperature. In most cases, the reaction is carried out in the absence of applied heat or only such heat as may be necessary to convert the reaction medium to liquid state if it is not already in such state. A maximum temperature of reaction up to the decomposition temperature of the P-fluorinated reaction product (or of the reactants, if lower) is not precluded. Ordinarily, however, the reaction is carried out at the lowest possible temperature that will provide maximum yield in minimum time. Superatmospheric pressures can be employed when it is desired to effect the reaction at a temperature above the boiling temperature of the reaction mass (or of the lowest boiling component thereof) at atmospheric pressures, e.g., a temperature of from about 40° C. to about 175° C.

Advantageously the reaction mass is stirred during part or all of the reaction period, and is continued until there is no further evolution of gas.

At the end of the reaction period the P-fluorinated compound or compounds formed during the reaction are isolated from the reaction mass by any suitable means or combination of means (keeping in mind the sensitivity of the desired product to hydrolysis), e.g., by filtration, centrifuging, decantation, evaporation of solvent, etc., and the isolated product (if insufficiently pure) is then purified, e.g., by washing with petroleum ether or other inert, anhydrous organic liquid. The isolation step or steps are usually carried out under anhydrous conditions, e.g., under an atmosphere of an inert gas, e.g., nitrogen, helium, argon, krypton, etc.

In order that those skilled in the art may better understand how the present invention can be carried into effect, the following examples are given by way of illustration and not by way of limitation. All parts and percentages are by weight unless otherwise indicated. Unless otherwise specified, vacuum-line and dry-box techniques were used in the following examples. Generally, gas pressures of 100 mm. Hg to about 700 mm. Hg were used therein.

Extreme caution is advised in performance of the following reactions as there is the possibility of explosion when tetrafluorohydrazine is reacted with organic materials although the following reactions were carried out without incident.

*Example 1*

Anhydrous triphenylphosphine (3.50 g.; 13.3 mmoles) is washed into a reactor with 30.0 ml. of anhydrous chlorobenzene. The reactor is 320 mm. long and 50 mm. wide, and is provided with a magnetic stirring bar. The chlorobenzene solution is degassed three times by pumping at the temperature of liquid nitrogen, and 15.3 mmoles of anhydrous, gaseous 87% tetrafluorohydrazine ($N_2F_4$), containing 13.3 mmoles of $N_2F_4$, is condensed into the evacuated reactor. The reactor is closed off from the vacuum line which is connected thereto, and the cooling bath surrounding the reactor is removed. Bubbles of gas begin to evolve. After a period of reaction for about 4 days, with stirring, a solid has precipitated from solution and no further gas evolution occurs.

The reactor is cooled with liquid nitrogen. After sampling the permanent gas for mass spectrometry, it is removed from the reactor. The remaining condensable gas amounts to 8.53 mmoles. The permanent gas is nearly all nitrogen while the condensable gas is predominantly unreacted $N_2F_4$.

The yield of nitrogen that is produced can be estimated for the following reaction:

(XII)  $(C_6H_5)_3P + \frac{1}{2}N_2F_4 \rightarrow (C_6H_5)_3PF_2 + \frac{1}{2}N_2$ Total gas charged=15.3 mmoles
$N_2F_4$ charged=13.3 mmoles
$N_2$ formed=15.3−8.5=6.8 mmoles
$N_2$ calculated=13.3÷2=6.65 mmoles Correcting for the vapor pressure of chlorobenzene increases the yield of nitrogen to 7.1 mmoles.

The condensable gas is removed from the reactor, and the solid product that remains is recovered by filtration under nitrogen. The dried solid comprising difluorotriphenylphosphorane weighs 1.26 g., and has a melting point of 148.5°–160° C. The yield of product corresponds to 32% of the theoretical yield. The infrared spectrum of the dried, solid material has major bands at 1445, 1120, 760, 745, 725, 690, and 670 cm.$^{-1}$.

*Analysis.*—Calc'd. for $C_{18}H_{15}PF_2$: C, 71.99; H, 5.03. Found: C, 71.38; H, 4.91.

An additional 2.41 g. (60% of the theoretical) of difluorotriphenylphosphorane is obtained from the chlorobenzene filtrate, which brings the total yield of the difluorotriphenylphosphorane to 92% of the theoretical yield. In marked contrast the maximum yield obtained by Smith, supra, using sulfur tetrafluoride as an oxidative fluorinating agent, is only 69%.

Example 1a

Anhydrous triphenylphosphine (1.77 g.; 6.77 mmoles) is charged into a 216 ml. reactor previously flamed out under vacuum. The reactor is evacuated and about 10 ml. of chlorobenzene is vacuum transferred into the reactor from a bulb containing phosphorus pentoxide. The reactor is cooled with liquid nitrogen and 8.4 mmoles of 90% pure tetrafluorohydrazine (7.55 mmoles of $N_2F_4$) is added by vacuum transfer. (The impurities in the tetrafluorohydrazine were fluorocarbons.) The cooling bath surrounding the reactor is removed and the reaction mixture is allowed to warm to room temperature and is stirred with a magnetic stirrer. At first, bubbles of gas evolve from the solution, but after about ¾ hour subsequent to removal of the cooling bath no further gas evolution is observed and a white solid product has separated from solution. After a reaction time of about two hours, the product is worked up.

The quantity of gas is unchanged, but now contains 3.4 mmoles of nitrogen (the theoretical amount produced by the reaction of $N_2F_4$ with all the $(C_6H_5)_3P$ charged to the reactor) as determined by mass spectrometry. After the excess tetrafluorohydrazine is removed, the solid product is filtered and washed with dry ether in a dry atmosphere. After removal of the ether under vacuum, 0.92 g. of difluorotriphenylphosphorane is recovered (45% yield). Duplicate melting points, determined using a dry, sealed capillary, are 158–159° C. and 160–162° C. The infrared spectrum is the same as for the product of Example 1.

*Analysis.*—Calc'd for $C_{18}H_{15}F_2P$: C, 71.99; H, 5.03; F, 12.65; P, 10.32. Found: C, 71.90; H, 5.33; F, 12.0; P, 10.25.

The same product is formed in a similar reaction using anhydrous ethyl ether instead of chlorobenzene and when triphenylphosphine is heated at 91° C. with excess tetrafluorohydrazine. However, the product from the latter reaction shows additional weak infrared absorptions at 877 and 784 cm.$^{-1}$ and has a lower melting point (141–150° C.) than the products prepared in solution.

Example 2

Diphenylphosphine (1.1 g.; 6.1 mmoles), dissolved in 30 ml. of 1,2,3-trichloropentafluoropropane, is charged into a magnetically stirred 100 ml. round-bottomed flask. These operations are carried out in a nitrogen-filled dry box. The flask is then attached to a vacuum line and, with cooling at 0° C., the system is evacuated. Tetrafluorohydrazine, 7.7 mmoles of 87% $N_2F_4$ (containing 6.7 mmoles of $N_2F_4$), is then allowed to diffuse over the stirred solution for 24 hours at 25° C. An initial pressure drop equivalent to 1.55 mmoles of gas occurs. Nitrogen gas evolution is measured intermittently by cooling most of the system in liquid nitrogen, pumping off the permanent gas, and expanding again. After 24 hours the evolution of nitrogen ceases, a total of 3.47 mmoles having been evolved. The residual condensable gas, which separates from the liquid portion, is found by infrared examination to be mainly fluorocarbons.

The solvent is distilled at 25° C. from an amber-colored oil, which is distilled bulb-to-bulb. The distillate, 0.8 g. (54% of the theoretical), is a colorless oil.

*Analysis.*—Calc'd for $C_{12}H_{10}F_3P$: C, 59.5; H, 4.2; P, 12.8. Found: C, 57.8; H, 4.4; P, 12.5.

Its infrared spectrum shows no P-H absorption at 2260 cm.$^{-1}$ and the presence of P-F absorption at 870 cm.$^{-1}$.

Nuclear magnetic resonance measurements are consistent with a structure in which one F atom is different from the other two F atoms (Formula XIII or XIV):

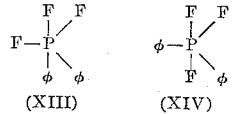

(XIII)    (XIV)

They are not consistent with a structure in which all three fluorine atoms are equivalent (Formula XV):

(XV)

In each of Formulas XIII, XIV, and XV, the symbol ϕ represents a phenyl radical.

Example 3

Di-n-butylphosphine (219.4 mg., 1.50 mmoles; B.P. 72° C./12 mm. Hg) is placed in a tube attached to a vacuum line and 0.74 mmole of $N_2F_4$ is condensed into the tube with the dibutylphosphine at −196° C. The total initial pressure is 409 mm. of Hg with the system at 30° C. The mixture is warmed to 30° C. and cooled to −196° C. at intervals over a 25-hour period. During each cycle, the pressure is measured at both temperatures. After the evolution of permanent gases (those not condensed at −196° C.) ceases, the condensable and the permanent gaseous products are separated from the colorless liquid product. All three fractions are then analyzed.

*Permanent gas:* This fraction amounts to 92% of the gaseous product and is shown by mass spectrometric analysis to contain >95% of nitrogen.

*Condensable gas:* This fraction constitutes the remaining 8% of the gases. Infrared and mass spectrometric analyses show it to contain about 20% unreacted $N_2F_4$ (this amounts to only 1.3% of the total originally charged) and about 80% of a mixture of butane and butene.

*Liquid product:* A very small amount of white solid is suspended in the liquid, but in too small a quantity to be isolated and identified. Infrared examination indicates the absence of a P-H band at 4.65–4.75$\mu$. However, nuclear magnetic resonance measurements show the expected splitting patterns for >$PF_2H$ in both the fluorine and hydrogen spectra. In addition, mass spectrometric measurements yield the following major fragments: 145, $(C_4H_9)_2P$; and 183, $(C_4H_9)_2PF_2$. These data fairly well establish that the major liquid product is di-n-butyldifluorophosphorane, $(n\text{-}C_4H_9)_2PHF_2$. The reaction stoichiometry appears to be:

(XVI)
$$2(n\text{-}C_4H_9)_2PH + N_2F_4 \rightarrow 2(n\text{-}C_4H_9)_2PHF_2 + N_2$$

*Example 4*

Tri-n-butylphosphine (0.595 mmole) and $N_2F_4$ (0.597 mmole) are permitted to react in the manner described in Example 3. The total initial pressure is 347 mm. of Hg after the system is warmed to 25° C. The pressure data are summarized in the following table:

*Table*

| Time, Hours | Total Pressure, mm. Hg, 25° C. | Perm. Gas Pressure,[1] mm. Hg, 25° C. |
|---|---|---|
| 0.25 | 347 | 52 |
| 1.83 | 345 | 199 |
| 4.00 | 344 | 231 |
| 6.67 | 345 | 237 |
| 9.58 | 344 | 238 |

[1] Pressure measured with reaction tube at −196° C. and corrected to 25° C.

After about 4 hours, the evolution of permanent gases (those not condensed at −196° C.) ceases. The condensable and the permanent gaseous products are then separated from the colorless liquid product, and all three fractions are analyzed.

*Permanent gas:* This fraction amounts to 69% of the total gaseous product and is shown by mass spectrometric analysis to contain mostly nitrogen.

*Condensable gas:* This fraction constitutes the remaining 31% of the gases. Infrared analysis shows it to be primarily $N_2F_4$.

*Liquid product:* Mass spectrometric analysis shows that the predominating fragment (over 50%) has a mass number of 183, $(n\text{-}C_4H_9)_2PF_2$. Nuclear magnetic resonance measurements also confirm the presence of P-F linkages.

*Example 5*

Phosphine apparently does not react with $N_2F_4$ on mixing and standing at about 0° C. However, a reaction does occur when these reactants are heated, e.g., for about 2 hours, or irradiated (the temperature rising to 110° C.) with ultraviolet light. The reaction may be illustrated by the following equation:

(XVII)
$$PH_3 + N_2F_4 \xrightarrow{110°\text{ C.}} (PH_2)_x + \text{P-F compound} + \text{an unknown substance having a mass number of 85.}$$

(A) A mixture of 0.184 mmole of phosphine and 0.181 mmole of $N_2F_4$ is admitted to a vacuum system at room temperature (about 20°–30° C.). After condensing the two reactants together into one bulb, the total initial pressure at 25° C. is 41.5 mm. Hg. Apparently no reaction occurs.

The mixture of gases is then irradiated in a Pyrex bulb, using a 400-watt ultraviolet source, for two hours without cooling. The temperature rises to 110° C. after 30 minutes' irradiation. At 110° C. the pressure rises from 41.5 mm. to 47.5 mm. Hg and, upon cooling to room temperature, drops to 35.5 mm. Hg. From the pressure drop it is calculated that about 0.0521 mmole of the gases have reacted.

A brownish-yellow solid forms as a coating on the inside of the reaction bulb. This solid is insoluble in carbon disulfide and is presumed to be a lower hydride of phosphorus, $[(PH_2)_x]$.

Examination of the gaseous product by infrared spectroscopy (confirmed by mass spectrometric analysis) shows the presence of residual phosphine and unreacted $N_2F_4$. There are also several strong bands in the 11.15–12.35$\mu$ region attributable to P-F absorption. More than 10 mole percent of components having mass numbers of 88 ($PF_3$) and 69 ($PF_2^+$) are observed upon mass spectrometric analysis. There is also present about 10 mole percent of an unknown substance having a mass number of 85.

(B) A mixture of 0.103 mmole of phosphine and 0.096 of $N_2F_4$ is admitted to a vacuum system at room temperature and condensed in one bulb as in the A portion of this example. Examination of the gaseous product by infrared spectroscopy (confirmed by mass spectrometric analysis) shows unreacted $PH_3$ and $N_2F_4$ but no bands which are attributable to P-F absorption.

The bulb containing the mixed gases, after sampling for analyses, is heated in a boiling water bath (99°–99.9° C.) for 1.5 hours. A brown solid, insoluble in $CS_2$, is deposited on the sides of the bulb, and which is presumably a hydrogen phosphide, $(PH_2)_x$, as in the A portion of this example.

Infrared examination of the gaseous product shows unreacted $PH_3$ and $N_2F_4$ as well as bands in the 810–890 cm.$^{-1}$ region which are indicative of P-F absorption.

This example shows that heating phosphine and $N_2F_4$ together to temperatures of the order of 99°–110° C., with or without irradiation from an ultraviolet source, enhances the tendency of the aforesaid reactant to form P-F linkages in the reaction product.

*Example 6*

A reaction is carried out without solvent between 1.40 g. (12.7 mmoles) of phenylphosphine, $C_6H_5PH_2$, and 13.7 mmoles of 87% tetrafluorohydrazine (11.9 mmoles of $N_2F_4$) following the same general procedure described under Example 2. A pressure decrease equivalent to 3.4 mmoles occurs, and 3.1 mmoles of permanent gas forms. From the gas measurements an approximate composition of $C_{12}H_{14}F_4NP_2$ is calculated for the solid (M.P.: 115°–200° C., mainly 115°–145° C.) that is formed.

*Analysis.*—Calc'd. for $C_{12}H_{14}F_4NP_2$: C, 46.4; H, 4.5; N, 4.5; F, 24.5. Found: C, 44.20; H, 4.90; N, 5.94; F, 21.4.

The wide M.P. range for the solid in a tube sealed under nitrogen, as in this case, indicates that a mixture of products has formed. The infrared spectrum of the solid has an intense broad absorption at 12.9$\mu$, which is indicative of P-F absorption, that is, of a compound wherein fluorine is bonded directly to phosphorus. A halocarbon mull of the solid shows absorption at 3.05–3.31$\mu$ and 6.9–7.1$\mu$, both probably due to ammonium-ion absorption. No P-H band is observed.

The foregoing and other observations are consistent with the observations made when reacting other phosphines with tetrafluorohydrazine, namely, that the principal reaction between phosphine and hydrocarbon-substituted phosphines is the fluorination of the phosphorus atom to yield a compound containing a P-F linkage.

*Example 7*

Tetrafluorohydrazine (1.7 mmoles; 198 mm. Hg, calculated) is condensed in the lower part of a mass spectrometry bulb and 0.73 mmole (83 mm. Hg, calculated) of trimethylphosphine in the upper part. The system is then allowed to warm to room temperature, during which period some white solid appears on the side of the bulb. The total pressure of the system reaches 265 mm. Hg. The calculated pressure of the system is 281 mm. Hg.

During several condensations of the reactants in liquid nitrogen, a progressive increase in the permanent gas pressure is observed. The reaction is allowed to proceed for about 16 hours at about 25° C. The total pressure is then 249 mm. Hg. After two condensations and evacuations, the pressure is 213 mm. Hg. The calculated amount of evolved nitrogen is 0.31 mmole or 85% of the theoretical.

The infrared spectrum of the product shows an absorption band at 14.99μ, which also is typical of that shown by difluorotriphenylphosphorane wherein fluorine is similarly bonded directly to phosphorus. Difluorotriphenylphosphorane is obtained by reacting triphenylphosphine with $N_2F_4$ as described under Examples 1 and 1a.

Example 8

Following essentially the same general procedure as described under Example 1, 2.82 g. (10.6 mmoles) of pure diphenylbromophosphine in 15 ml. of chlorobenzene is reacted with 17.15 mmoles of 90% tetrafluorohydrazine (15.4 mmoles of $N_2F_4$) for 17 hours at room temperature (20°–30° C.). A pressure drop equivalent to 1.6 mmoles occurs. The product gases consist of 4.4 mmoles of permanent gas and unreacted tetrafluorohydrazine together with the usual impurities.

Infrared examination of the liquid reaction product shows an absorption band characteristic of P-F absorption, indicating the presence of a compound containing fluorine bonded directly to phosphorus.

Some of the P-fluorinated compounds resulting from the method of this invention are useful as gasoline additives or as insecticidal compositions or as components of such compositions. All of them are useful as intermediates in the chemical synthesis of other compounds. For instance, difluorotriphenylphosphorane can be hydrolyzed to triphenylphosphine oxide as described in Example 9.

Example 9

Difluorotriphenylphosphorane (0.109 g.; 0.36 mmole), M.P. 148.5°–160° C., is stirred for about 16 hours with 10 ml. of a solution of approximately 10% sodium hydroxide in a 1:1 volume ratio of ethanol and water. The solvents are removed mainly by distillation, and the solid product is carefully washed with deionized water. The yield is 67.9 mg. (67% of the theoretical yield) of triphenylphosphine oxide, M.P. 156°–156.4° C. The infrared spectrum of this material is comparable with that of a known sample of triphenylphosphine oxide.

We claim:
1. The method of producing compounds containing fluorine bonded directly to phosphorus which comprises treating, under anhydrous conditions, with an oxidative fluorinating agent comprising tetrafluorohydrazine, a P-fluorinatable trivalent phosphorus-containing compound selected from the group consisting of

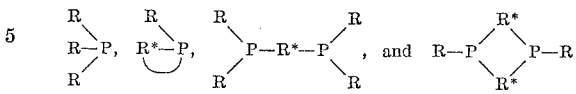

wherein each R represents a member of the group consisting of hydrogen, hydrocarbon radicals, and substituted hydrocarbon radicals and wherein each R* represents a member of the group consisting of hydrocarbon radicals and substituted hydrocarbon radicals, said substituted hydrocarbon radicals having as a substituent a member selected from the group consisting of halo, cyano, lower alkoxy, phenoxy and R'C(O)O— radicals wherein R' is hydrogen or lower alkyl.

2. A method as in claim 1 wherein the P-fluorinatable trivalent phosphorus-containing compound is $(C_6H_5)_3P$.
3. A method as in claim 1 wherein the P-fluorinatable trivalent phosphorus-containing compound is $(C_6H_5)_2PH$.
4. A method as in claim 1 wherein the P-fluorinatable trivalent phosphorus-containing compound is $C_6H_5PH_2$.
5. A method as in claim 1 wherein the P-fluorinatable trivalent phosphorus-containing compound is $(C_4H_9)_2PH$.
6. A method as in claim 1 wherein the P-fluorinatable trivalent phosphorus-containing compound is $(C_4H_9)_3P$.
7. A method as in claim 1 wherein the P-fluorinatable trivalent phosphorus-containing compound is $(CH_3)_3P$.
8. A compound of the formula

wherein R is alkyl.
9. $(C_4H_9)_2PHF_2$.
10. The method of producing difluorotriphenylphosphorane which comprises reacting together, at ambient temperature, a chlorobenzene solution of approximately stoichiometrical proportions of triphenylphosphine and tetrafluorohydrazine until there is no further evolution of gas; and isolating difluorotriphenylphosphorane from the resulting reaction mass.

References Cited by the Examiner

UNITED STATES PATENTS 2,904,588  9/1959  Smith _____ 260—543

OTHER REFERENCES

Hackh's Chemical Dictionary, Third Ed. (1944), page 18.

LORRAINE A. WEINBERGER, *Primary Examiner.*

REUBEN EPSTEIN, CARL D. QUARFORTH,
*Examiners.*

L. A. SEBASTIAN, H. C. WEGNER,
*Assistant Examiners.*